Jan. 23, 1945. M. B. HERBRICK 2,367,774
CLEANING DEVICE
Filed March 27, 1942

Inventor
Milton B. Herbrick
By Arthur H. Sturges
Attorney

Patented Jan. 23, 1945

2,367,774

UNITED STATES PATENT OFFICE 2,367,774

CLEANING DEVICE

Milton B. Herbrick, Sterling, Colo.

Application March 27, 1942, Serial No. 436,405

3 Claims. (Cl. 15—118)

This invention relates to cleaning utensils and has for an object to provide a device particularly useful for removing debris from automobile windshield glass and the like.

Another object of the invention is to provide a simple device for said purpose which is economical in manufacture and durable.

A further object of the invention is to provide a flexible soft cloth arranged to readily absorb water for a distribution of the latter upon a windshield glass and cooperative flexible, non-absorbent, non-abrasive strips so attached to the cloth that the water is evenly distributed upon the glass, said strips being so constructed and arranged that they are provided with a multiplicity of non-absorbent cutting or scraping edges for a removal of debris from said glass in conjunction with the cloth at times when the latter is saturated with water, the construction being such that said glass does not become marred or scratched during cleaning operations.

Still further and other objects and advantages of the invention will be understood from the following detailed description thereof, reference being had to the accompanying drawing in which.

It is well known that especially during the summer time the windshields of motor vehicles often become cluttered with debris particularly resultant from grasshoppers and similar insects becoming impinged against and smashed upon the glass thereof during forward travel of said vehicles, whereby a gummy substance from said insect source spreads over and adheres to the glass to such an extent that the driver's visibility through the glass is poor or impossible and operation of said vehicles dangerous or impeded. Also dried mud and the like becomes adhered to the glass of a windshield whereby frequent cleaning operations are necessitated. It is also well known that a large number of chemical compounds are on the market for the purpose of aiding in the removal of said debris from windshields together with mechanical devices such as squeegee wipers and the like for said purpose. However, squeegee devices and chemical compounds do not provide means for thoroughly removing said debris except by separate application and repetitious operations and the present invention aims to provide cooperative means assembled in one tool for quickly, economically and thoroughly removing said debris from windshields.

Figure 5:
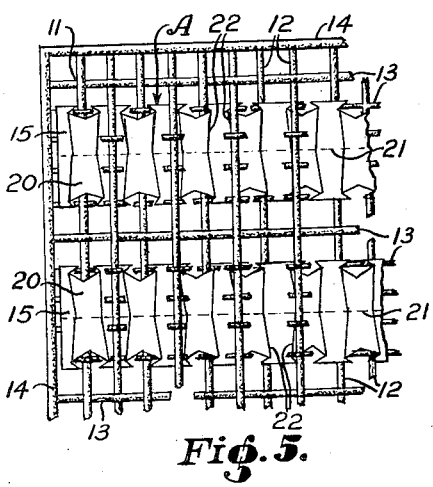
Figure 5 is a plan view of a fragment of a modification of the preferred embodiment of the invention.

Referring now to the drawing for a more particular description 10 indicates generally the new device which includes a base cloth 11 of any desired size formed of warp strands 12 and weft strands 13 normally disposed at a right angle with respect to said warp strands. Said warp and weft strands are suitably interwoven with respect to each other being comparatively widely spaced apart preferably, as shown in Figure 5, whereby a flexible, soft preferably foraminous cloth is provided.

The strands 12 and 13 are composed of cotton threads which are adapted to absorb water for conveying said water to and upon a windshield glass during a cleaning of the latter, said strands being formed of said soft material in order that said glass does not become marred thereby during said operation. The binding edges 14 of the device 10 are also suitably interwoven to the strands 12 and 13 being also formed of said soft material for said purpose.

Transversely disposed across the cloth 11 and attached thereto by suitable means spaced apart strips 15 are provided.

The strips 15 are formed of a substance that is pliable, adapted to be folded without breaking, comparatively thin in cross section, having a further essential characteristic of being impervious to moisture, non-absorbent of water, of comparatively good tensile strength and wearing quality when processed as later described, together with being non-abrasive when applied to glass. These desirable and essential characteristics of said strip are inherent in sheets of "Pliofilm" a cellulose derived substance obtainable on the open market, said sheets being cut into elongated strips of width and length complemental to the selected size of the foraminous base cloth 11.

Figure 4:
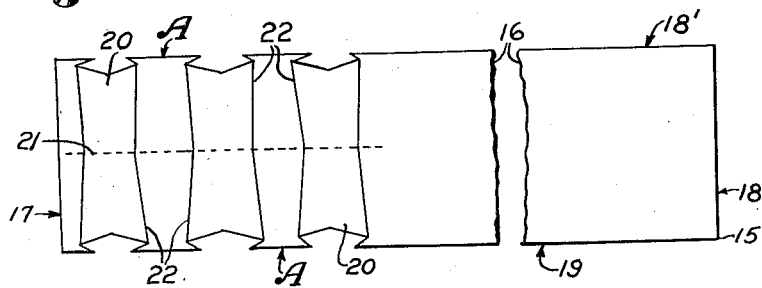
Figure 4 is a top plan view, on an enlarged scale, of a partially processed strip employed, a certain portion thereof being broken away.

In Figure 4, a strip 15 is depicted having a main body portion 16, a processed end portion 17 and an unprocessed end portion 18, together with side edges 18' and 19. The processing may be consummated by hand operating, if desired, and is more readily accomplished by means of a sewing machine and the use of its conventional puckering or shirring or ruching mechanism in connection therewith. The strip is folded and gathered into puckers 20 while passing through and by said mechanism, the latter also providing a row of stitches 21 through the main body portion of the strips and puckers for maintaining the gathered puckers 20 in position with respect to each other whereby the strip is provided with a large number of puckers throughout its length, said puckers being usually of irregular contour in plan.

Each pucker or shirr 20 is thus provided with a plurality of non-absorbent edges or cutters 22 a multiplicity of said edges being provided for each strip 15 by said processing. Also since the formation of the puckers stiffens the edges 18' and 19 of the strips between the puckers the said edges provide cutters as indicated at A in Figure 4.

Figure 1:
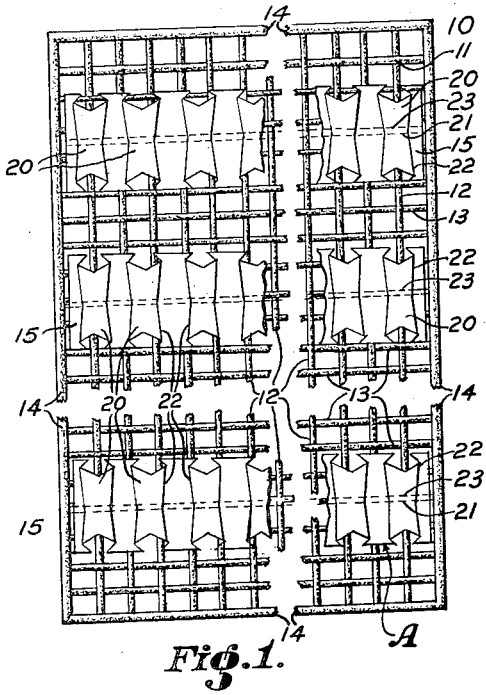
Figure 1 is a plan view of the new device, certain portions thereof being broken away.
Figure 2:
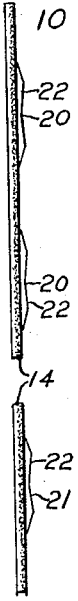
Figure 2 is an edge view of the device shown in Figure 1, certain puckers employed being uncompacted.
Figure 3:
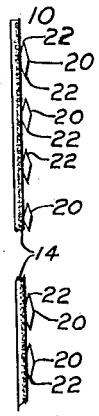
Figure 3 is an edge view taken at a right angle with respect to the view shown in Figure 2.

At times when it is desired to directly attach the strips 15 to the cloth 11 the latter may be placed under the conventional foot of a sewing machine mechanism in a well known manner and secured by means of rows of attaching stitches 23 as shown in Figure 1 for providing a plurality of spaced apart puckered strips attached to one side of the base cloth 11.

Referring to the modification shown in Figure 5, it will be understood that the cloth 11 is provided approximately as above described and in lieu of attaching the puckered, ruched or shirred strips 15 to the cloth by means of stitches 23 said puckered strips are interwoven between alternate warp strands, certain of the weft strands being partially severed where necessary, as shown in Figure 5. The advantage of the modification is that the stitching 23 is omitted. Also since the cloth 11 through repeated use, will ultimately wear out and the strips 15 being of greater life-use, upon the cloth 11 becoming unduly worn the strips 15 may be removed therefrom and inserted, by the owner, in a new cloth readily and without sewing.

In operation the cloth 11 is saturated with water, applied to and pressed against the glass, being moved briskly thereagainst, the operator placing his palm adjacent the middle of the cloth shown and against the side thereof which is opposite to the strips, whereby the puckers bear against the glass, said pressure flattening said puckers and squeezing water out of the cloth, together with distributing said water upon the glass.

In order to provide an adequate and approximately evenly proportional distribution of water to the cutter edges 22 the strips 15 are preferably evenly spaced apart in order that water becomes trapped between oppositely disposed strips under the operator's plam and between the latter and the windshield glass at the time pressure is applied by said palm for squeezing water out of plied by said palm for squeezing water out of the cloth and for compacting the puckers against said glass for causing the edges 22 to engage said debris. The water trapped between the strips readily permeates between the puckers and is applied to said cutter edges 22 and since the latter are disposed at an angle with respect to each other, normally and especially so disposed resultant from motion in various directions applied by the operator during brisk movements to and fro of his palm, the edges 22 quickly loosen and remove said debris since said edges engage the debris from all angles.

During said brisk movement of the cloth the sufficiently sharp edges or cutters 22 of the puckers 20 cooperate with said water and cloth for loosening and cutting debris from the glass without marring the latter, since said water does not lessen the cutting characteristics of the non-absorbent, non-abrasive edges 22 of the pliable puckers 20, the latter bending sufficiently, resultant from said pressure, to permit said edges to confront and engage said debris during contact thereof with the surface of said glass. The cloth 11 is preferably foraminous since the same provides operators for receiving debris therein particularly at times when debris has accumulated thickly or heavily on the glass prior to a removal thereof.

From the foregoing description it is thought to be obvious that a cleaning device constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish it to be understood as limiting myself to the precise arrangement and formation of the several parts herein shown in carrying out my invention in practice except as claimed.

I claim:
1. A cleaning device for windshield glass comprising a flexible water absorbent cloth, a plurality of flexible non-absorbent pliable strips transversely disposed across said cloth in spaced relation to one another and stitching extending through the longitudinal center of each strip, each of said strips being normally of greater length than the length of said cloth and puckered to contract the length thereof equal to the length of said cloth, said puckering forming yieldable portions offset from said cloth, the opposite lengthwise edges of said strips being free of said cloth whereby the puckered portions thereof may flex independent of said cloth.

2. A cleaning device as set forth in claim 1 wherein said puckered portions are formed with angularly related relatively flat portions to thereby provide a plurality of abrasive edges.

3. A cleaning device as set forth in claim 1 wherein said cloth is formed of loosely woven strands.

MILTON B. HERBRICK.